(12) United States Patent
Billman et al.

(10) Patent No.: US 11,940,159 B2
(45) Date of Patent: Mar. 26, 2024

(54) TEMPERATURE PROBE FOR A COOKTOP APPLIANCE WITH A GAS BURNER

(71) Applicant: Haier US Appliance Solutions, Inc., Wilmington, DE (US)

(72) Inventors: David William Billman, Louisville, KY (US); John Pottenger, Louisville, KY (US); Michael Blum, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 784 days.

(21) Appl. No.: 16/815,387

(22) Filed: Mar. 11, 2020

(65) Prior Publication Data

US 2021/0285649 A1    Sep. 16, 2021

(51) Int. Cl.
*F24C 3/12*    (2006.01)
*G01K 13/00*    (2021.01)
*H05B 1/02*    (2006.01)

(52) U.S. Cl.
CPC .......... *F24C 3/126* (2013.01); *F23N 2241/08* (2020.01); *G01K 13/00* (2013.01); *H05B 1/0266* (2013.01)

(58) Field of Classification Search
CPC ..... F24C 3/126; F23N 2241/08; G01K 13/00; H05B 1/0266
See application file for complete search history.

(56) References Cited

U.S. PATENT DOCUMENTS

| 9,841,191 | B2 | 12/2017 | Johncock et al. |
| 10,092,129 | B2 | 10/2018 | Jenkins et al. |
| 2016/0051078 | A1* | 2/2016 | Jenkins ................ H05B 6/1209 |
| | | | 99/341 |

FOREIGN PATENT DOCUMENTS

| FR | 2604647 | A1 * | 4/1988 | ............. B23Q 7/043 |
| JP | 2014041721 | A | 3/2014 | |
| KR | 101949913 | B1 * | 2/2019 | ............. F24C 3/027 |
| KR | 101949913 | B1 | 2/2019 | |

* cited by examiner

*Primary Examiner* — Son T Le
*Assistant Examiner* — Matthew W. Baca
(74) *Attorney, Agent, or Firm* — Dority & Manning, P.A.

(57) ABSTRACT

A temperature probe for a cooktop appliance includes a probe body and a temperature sensor extending from the probe body. The temperature probe also includes a first arm and a second arm configured to mount on a cooking utensil. The temperature probe further comprises a controller configured to communicate with a controller of the cooktop appliance and to transmit a signal to the controller of the cooktop appliance corresponding to a size of the cooking utensil.

18 Claims, 8 Drawing Sheets

TEMPERATURE PROBE FOR A COOKTOP APPLIANCE WITH A GAS BURNER

FIELD OF THE INVENTION

The present subject matter relates generally to cooktop appliances with gas burners, such as gas range appliances or gas stove appliances.

BACKGROUND OF THE INVENTION

Certain cooktop appliances include gas burners for heating cooking utensils on the cooktop appliances. Some users prefer gas burners over electric heating elements due to the adjustability of gas burners. However, precisely heating a cooking utensil with a gas burner can be difficult. For example, a user may have to constantly monitor the cooking utensil and tweak the control valve to maintain a particular temperature in the cooking utensil, and such monitoring and adjustment can be tedious.

Providing automated heating with a gas burner also presents difficulties. For example, the appropriate operating range, such as heat output from the gas burner, may vary depending on the size of the cooking utensil. A smaller cooking utensil, relative to the size or output of the gas burner, may not be suitable for use with the upper portion of the gas burner's operating range.

Accordingly, a cooktop appliance with features for operating a gas burner to maintain a particular temperature in a cooking utensil while also operating the gas burner within an appropriate range for the cooking utensil would be useful.

BRIEF DESCRIPTION OF THE INVENTION

Aspects and advantages of the invention will be set forth in part in the following description, or may be apparent from the description, or may be learned through practice of the invention.

In one example embodiment of the present disclosure, a temperature probe for a cooktop appliance is provided. The cooktop appliance may include a gas burner, a control valve coupled to the gas burner to regulate a flow of fuel to the gas burner, and a controller in communication with the control valve. The temperature probe includes a probe body and a temperature sensor extending from the probe body. The temperature probe also includes a fixed arm connected to the probe body. The fixed arm is configured for mounting on a cooking utensil at a first side of the cooking utensil. The temperature probe also includes an extension arm connected to the probe body. The extension arm is configured for mounting on a second side of the cooking utensil opposite the first side of the cooking utensil. The temperature probe further includes a controller configured for communication with the controller of the cooktop appliance. The controller of the temperature probe is configured to transmit a signal to the controller of the cooktop appliance based on the position of the extension arm of the temperature probe.

In another example embodiment of the present disclosure, a temperature probe for a cooktop appliance is provided. The cooktop appliance may include a gas burner, a control valve coupled to the gas burner to regulate a flow of fuel to the gas burner, and a controller in communication with the control valve. The temperature probe includes a probe body and a temperature sensor extending from the probe body. The temperature probe also includes a fixed arm extending from a first side of the probe body and an extension arm extending from a second side of the probe body opposite the first side of the probe body. The temperature probe further includes a controller configured for communication with the controller of the cooktop appliance. The controller of the temperature probe is configured to transmit a signal to the controller of the cooktop appliance based on the position of the extension arm of the temperature probe.

In yet another example embodiment, a method of operating a cooktop appliance is provided. The cooktop appliance may include a gas burner, a control valve coupled to the gas burner to regulate a flow of fuel to the gas burner, and a controller in communication with the control valve. The temperature probe may include a probe body, a temperature sensor extending from the probe body, a fixed arm extending from a first side the probe body, an extension arm extending from a second side of the probe body opposite the first side of the probe body, and a controller configured for communication with the controller of the cooktop appliance. The controller of the temperature probe may be configured to transmit a signal to the controller of the cooktop appliance based on the position of the extension arm of the temperature probe. The method includes operating the gas burner within a first range defined by a first maximum rate when the signal from the controller of the temperature probe indicates that the extension arm is in a retracted position and operating the gas burner within a second range defined by a second maximum rate when the signal from the controller of the temperature probe indicates that the extension arm is in an extended position. The first maximum rate is less than the second maximum rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
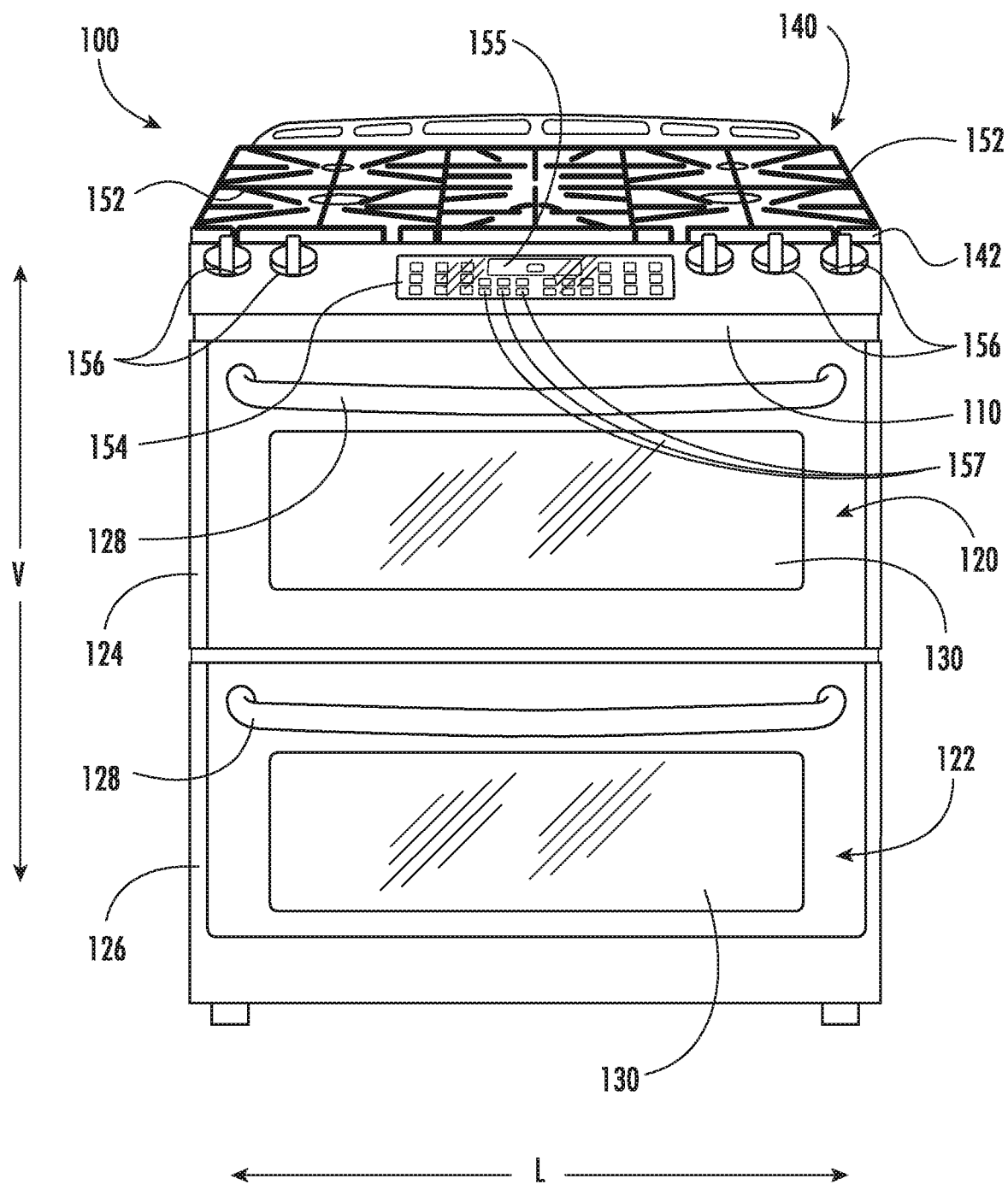
FIG. 1 provides a front, perspective view of a cooktop appliance which may be used with a temperature probe according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The detailed description uses numerical and letter designations to refer to features in the drawings. Like or similar designations in the drawings and description have been used to refer to like or similar parts of the disclosure.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
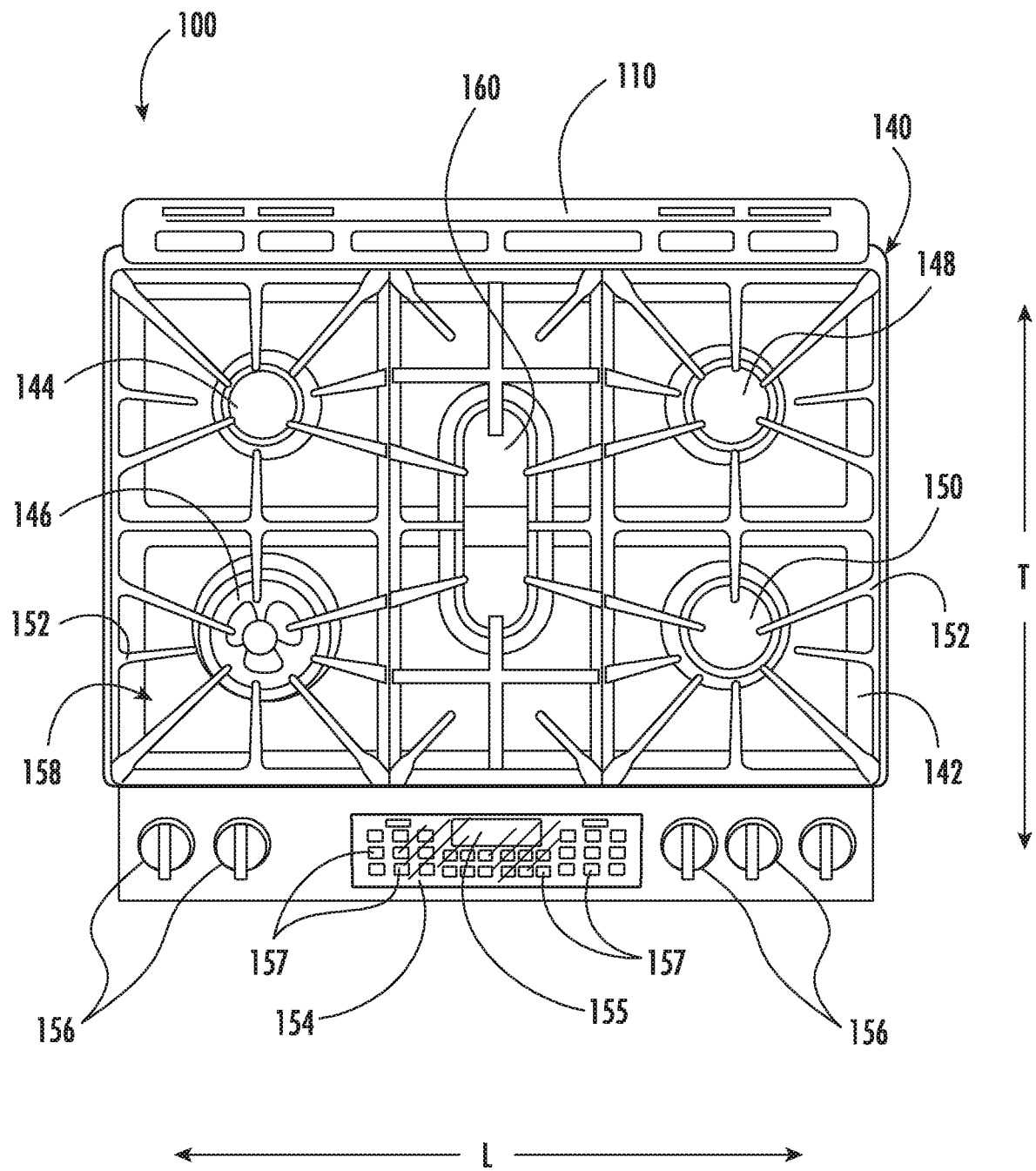
FIG. 2 provides a top, overhead view of the example appliance of FIG. 1.

FIG. 1 provides a front, perspective view of a range appliance 100 as may be employed with the present subject matter. FIG. 2 provides a top, overhead view of range appliance 100. Range appliance 100 includes an insulated cabinet 110. The range appliance 100 includes a cooktop 140 and therefore is an example embodiment of a cooktop appliance 100. Cabinet 110 defines an upper cooking chamber 120 and a lower cooking chamber 122. Thus, range appliance 100 is generally referred to as a double oven range appliance. As will be understood by those skilled in the art, range appliance 100 is provided by way of example only, and the present subject matter may be used in any suitable cooktop appliance, e.g., a single oven range appliance or a standalone cooktop appliance. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Range appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Range appliance 100 also includes a cooktop 140. Cooktop 140 is positioned at or adjacent a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

Figure 3:
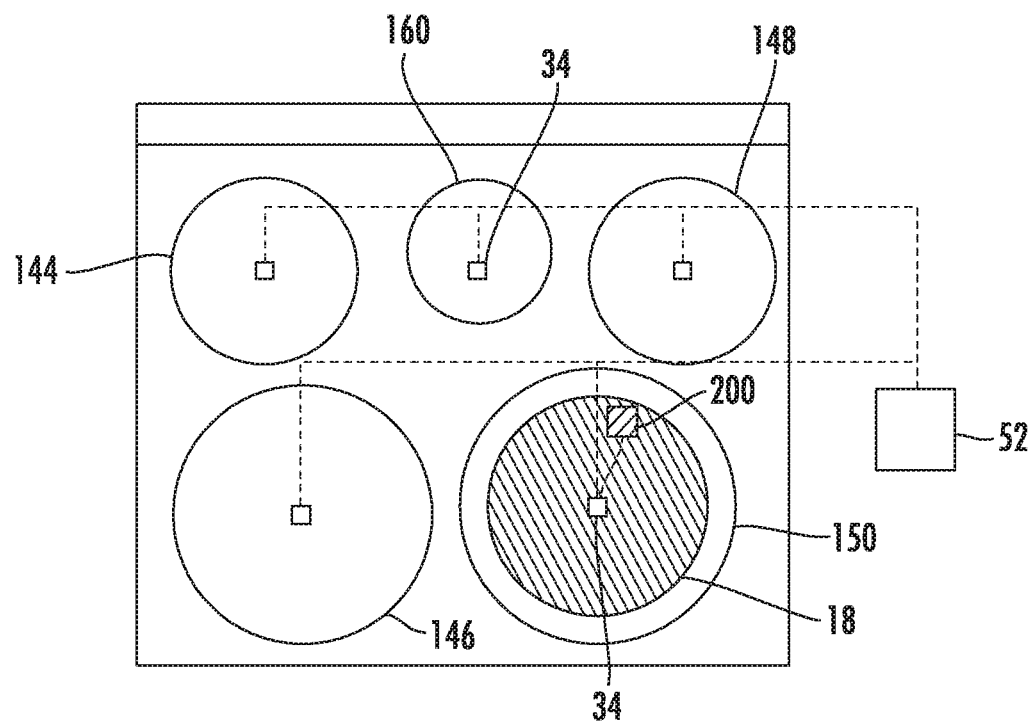
FIG. 3 provides a top, schematic view of the exemplary cooktop appliance of FIG. 1.
Figure 4:
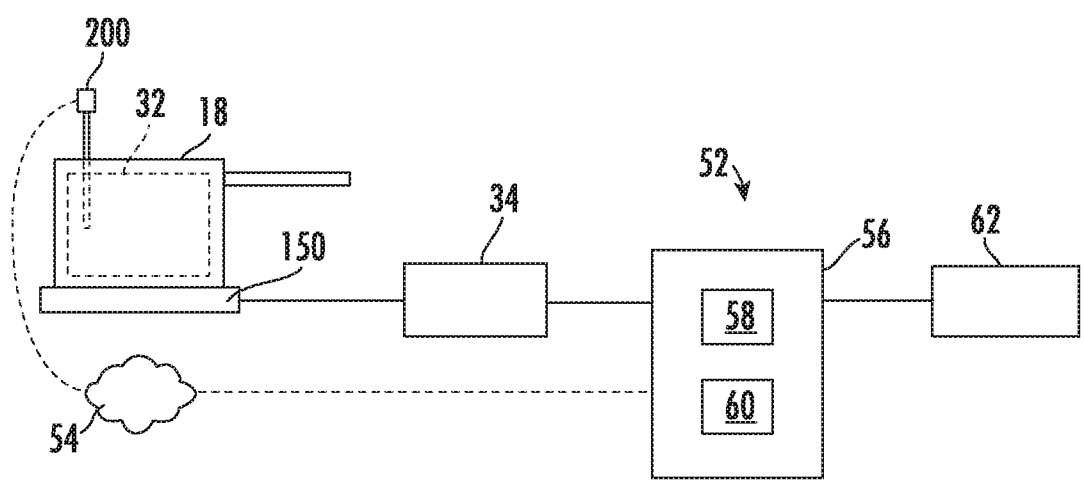
FIG. 4 provides a schematic diagram of a control system, including a temperature probe, as may be used with the exemplary cooktop appliance of FIG. 1.

For range appliance 100, a utensil 18 (FIGS. 3, 4, 7, and 8) holding food and/or cooking liquids (e.g., oil, water, etc., where the food and/or cooking liquids are schematically represented at 32 in FIG. 4) may be placed onto grates 152 at a location of any of burners 144, 146, 148, 150. Burners 144, 146, 148, 150 provide thermal energy to cooking utensils on grates 152. As shown in FIG. 2, burners 144, 146, 148, 150 can be configured in various sizes so as to provide, e.g., for the receipt of cooking utensils (i.e., pots, pans, etc.) of various sizes and configurations and to provide different heat inputs for such cooking utensils. Grates 152 are supported on a top surface 158 of top panel 142. Range appliance 100 also includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this example embodiment, user interface panel 154 includes knobs 156 that are each associated with one of burners 144, 146, 148, 150 and griddle burner 160. Knobs 156 allow the user to activate each burner and determine the amount of heat input provided by each burner 144, 146, 148, 150 and griddle burner 160 to a cooking utensil located thereon. The user interface panel 154 may also include one or more inputs 157, such as buttons or a touch pad, for selecting or adjusting operation of the range appliance 100, such as for selecting or initiating a precision cooking (closed-loop) mode, as will be described in more detail below. User interface panel 154 may also be provided with one or more graphical display devices 155 that deliver certain information to the user such as e.g., whether a particular burner is activated and/or the temperature at which the burner is set.

Although shown with knobs 156, it should be understood that knobs 156 and the configuration of range appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads. The user interface panel 154 may include other display components, such as a digital or analog display device 155, designed to provide operational feedback to a user.

FIG. 3 is a schematic view of certain components of range appliance 100. In particular, as shown in FIG. 3, range appliance 100 includes five heating elements (burners) 144, 146, 148, 150, and 160, spaced along the cooktop 140. A cooking utensil 18, also depicted schematically, is positioned on a first heating element 150 of the plurality of heating elements by way of example. An example temperature probe 200 is schematically depicted within the utensil 18.

Still referring to FIG. 3, the range appliance 100 may include a fuel supply system including one or more control valves 34, such as a control valve 34 associated with, e.g., connected to, each burner 144, 146, 148, 150, and 160. The fuel supply system may include a supply line and each control valve 34 may be connected to the supply line, such as fluidly coupled to the supply line, to selectively provide fluid communication from the supply line to the respective burner. The supply line may be a metal tube, such as copper or aluminum tubing, that is connectable to a fuel supply. Thus, the supply line may receive a flow of pressurized gaseous fuel, e.g., natural gas or propane, from the fuel supply. When the corresponding control valve 34 is opened, the gaseous fuel may thereby flow from the fuel supply to the respective burner through the supply line. Such tubing and supply lines generally are understood by those of ordinary skill in the art and, as such, are not specifically illustrated for sake of clarity.

As may be seen in FIGS. 3 and 4, the control valves 34 may each be connected to and in operative communication with a controller 52 of the range appliance 100. Each control valve 34 may be an electronic pressure regulating valve, a motorized valve, a modulating valve, a solenoid valve, or some other variable type gas flow valve. Thus, each control valve 34 may be automatically adjusted, e.g., by the controller 52, to regulate the flow of gaseous fuel to the corresponding burner 144, 146, 148, 150, or 160.

As best seen in FIG. 4, the controller 52 may generally include a computing device 56 having one or more processor(s) 58 and associated memory device(s) 60. The computing device 56 may be configured to perform a variety of computer-implemented functions to control the exemplary cooktop appliance 100. The computing device 56 can include a general purpose computer or a special purpose computer, or any other suitable computing device, such as general or special purpose microprocessors operable to execute programming instructions or micro-control code associated with operation of range appliance 100. It should be appreciated, that as used herein, the processor 58 may refer to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can be a separate component from the processor or can be included onboard within the processor. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods described below. Alternatively, controller 52 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As illustrated in FIG. 4, the range appliance 100 may also include a user interface 62 operably connected to the controller 52. User interface 62 may correspond to user interface panel 154 in certain example embodiments. In such example embodiments, user interface 62 may be positioned on top panel 142 and may be in communication with controller 52 via a wiring harness. However, in other exemplary embodiments, the user interface 62 may additionally, or alternatively, be wirelessly connected to the controller 52 via one or more suitable wireless communication networks (such as the exemplary wireless communication network 54 described below). As an example, user interface 62 may correspond to an application on a smartphone or other remote device, and the user may utilize the application to, e.g., establish a set temperature for one of the gas burners 144, 146, 148, 150, or 160. In such example embodiments, user interface 62 may be in wireless communication with controller 52, e.g., via a Bluetooth® or Wi-Fi® connection.

Thus, the range appliance 100 may include the controller 52, and the controller 52 may regulate various components of range appliance 100. Controller 52 may be in operative communication with various components of range appliance 100, such as user interface 154, including the inputs 157 and display 155 thereon, control valves 34, and/or a temperature probe 200. For example, as mentioned, controller 52 may adjust a corresponding control valve 34 in order to regulate the flow of gaseous fuel to an associated burner 144, 146, 148, 150, or 160. Signals may be routed between controller 52 and the various operational components of range appliance 100. Thus, controller 52 can selectively activate and operate these various components. Various components of range appliance 100 are communicatively coupled with controller 52 via one or more communication lines, such as, e.g., signal lines, shared communication busses, or wirelessly.

Controller 52 is also in communication with temperature probe 200. Temperature probe 200 is separate from burner 150, and temperature probe 200 is configured to measure a temperature at the utensil 18 heated by burner 150. Controller 52 receives temperature measurements from temperature probe 200. For example, controller 52 and temperature probe 200 may each include a wireless transmitter/receiver such that controller 52 and temperature probe 200 communicate with each other wirelessly, e.g., via a Bluetooth® or Wi-Fi® connection. As an example of wireless communication, the temperature probe 200 may be configured as a wireless sensor in wireless communication with the controller 52 via a wireless communications network 54. In certain exemplary embodiments, the wireless communications network 54 may be a wireless sensor network (such as a Bluetooth communication network), a wireless local area network (WLAN), a point-to point communication networks (such as radio frequency identification networks, near field communications networks, etc.), or a combination of two or more of the above communications networks. In additional embodiments, the temperature probe 200 may communicate with the controller 52 via a wired connection, e.g., the temperature probe 200 may also include a plug which is configured to be received in a socket on the cooktop appliance 100 to provide wired communication between the temperature probe 200 and the controller 52.

Figure 5:
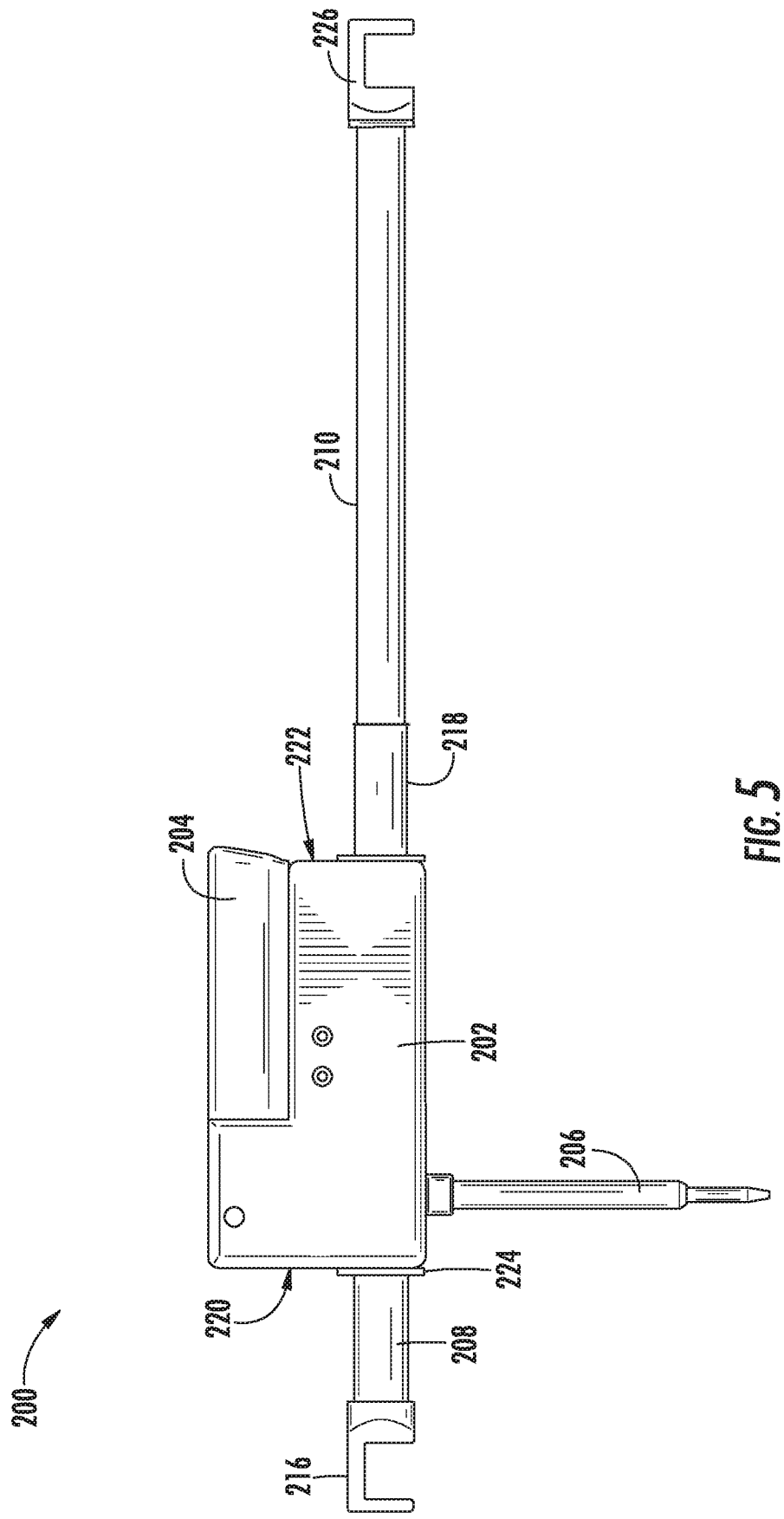
FIG. 5 provides a side view of an exemplary temperature probe according to one or more embodiments of the present subject matter.
Figure 6:
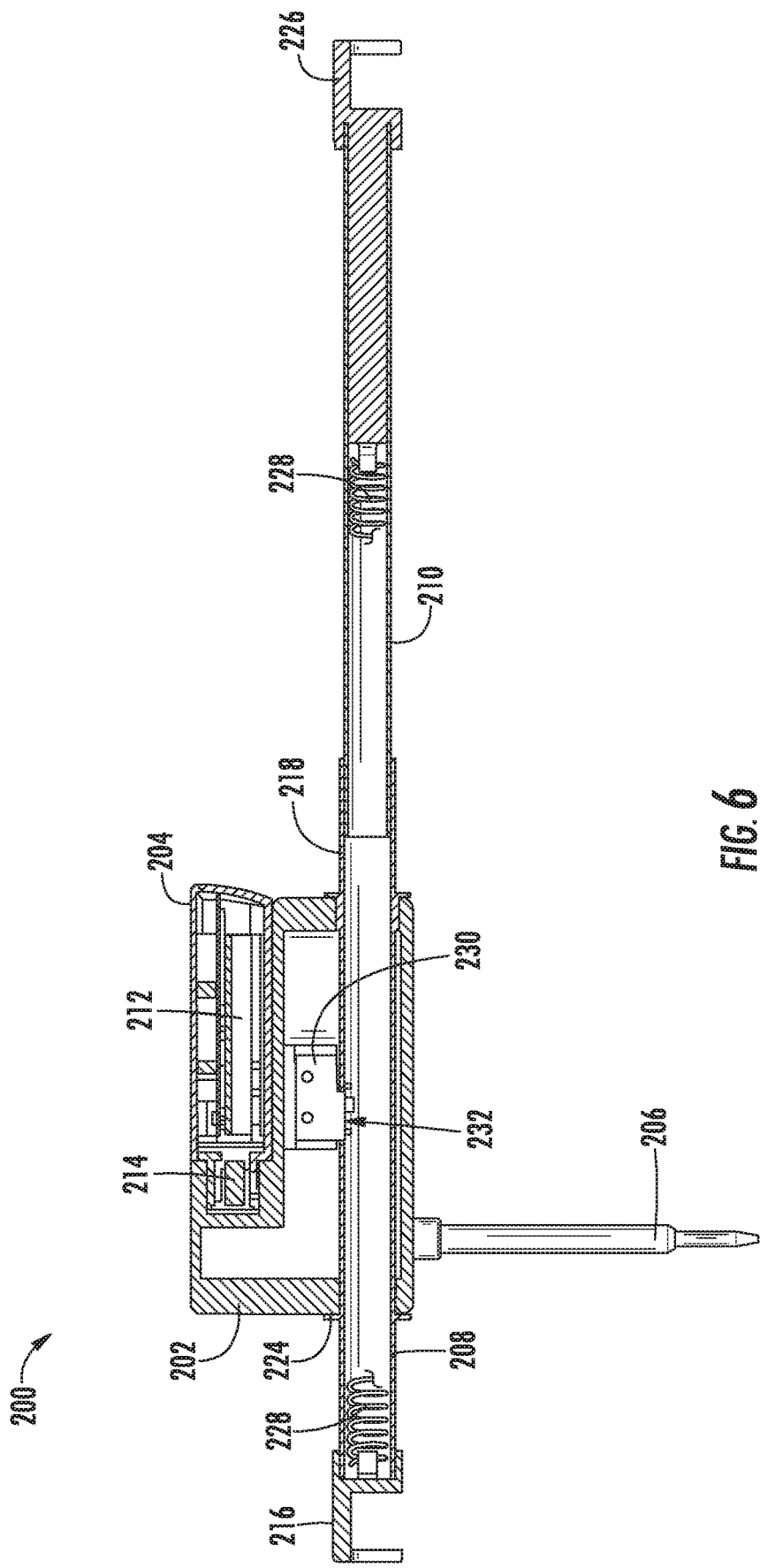
FIG. 6 provides a section view of the temperature probe of FIG. 5.

FIG. 5 illustrates a side view of an exemplary temperature probe 200 and FIG. 6 provides a section view of the exemplary temperature probe 200 of FIG. 5. In some embodiments, e.g., as illustrated in FIGS. 5 and 6, the temperature probe 200 may include a probe body 202, a control module 204, and a temperature sensor 206 extending from the probe body 202. The temperature probe 200 may further include a fixed arm 208 connected to the probe body 202 and an extension arm 210 connected to the probe body 202. For example, in some embodiments, the fixed arm 208 may be connected to and may originate at a first side 220 of the probe body 202 and the extension arm 210 may be connected to and may originate at a second side 222 of the probe body 202 opposite the first side 220 of the probe body 202. In some embodiments, the fixed arm 208 and the extension arm 210 may be aligned and may be colinear. For example, as described in more detail below, the fixed arm 208 and the extension arm 210 may be configured to span a diameter 26 (FIGS. 7 and 8) of a cooking utensil 18 when the temperature probe 200 is mounted on the cooking utensil 18.

In some embodiments, the extension arm 210 may telescopically extend from the probe body 202 opposite the fixed arm 208. For example, the extension arm 210 may be telescopically mounted within a sleeve 218. As best seen in FIG. 6, the sleeve 218 may, in some embodiments, extend through the probe body 202, e.g., fully between the first side 220 and the second side 222 of the probe body 202. In some embodiments, the fixed arm 208 may be integrally formed with the sleeve 218, e.g., as illustrated in FIG. 6 where the fixed arm 208 and the sleeve 218 are a single body and where the portions of the single body which define the fixed arm 208 and the sleeve 218 are delineated by a flange 224 at the first side 220 of the probe body 202.

In some embodiments, e.g., as illustrated in FIGS. 5 and 6, the temperature sensor 206 may extend from the probe body 202 generally perpendicularly to the fixed arm 208 and the extension arm 210. In certain exemplary embodiments, the temperature sensor 206 may utilize any suitable technology for sensing/determining a temperature of food or other substances, e.g., water such as a sous vide bath, 32 (FIG. 4) positioned in the cooking utensil 18. For example, the temperature sensor 206 may utilize one or more thermocouples, thermistors, optical temperature sensors, infrared temperature sensors, etc. Alternatively, however, the temperature sensor 206 may be configured to determine a temperature of one or more items 32 positioned within the cooking utensil 18 in any other suitable manner.

Figure 7:
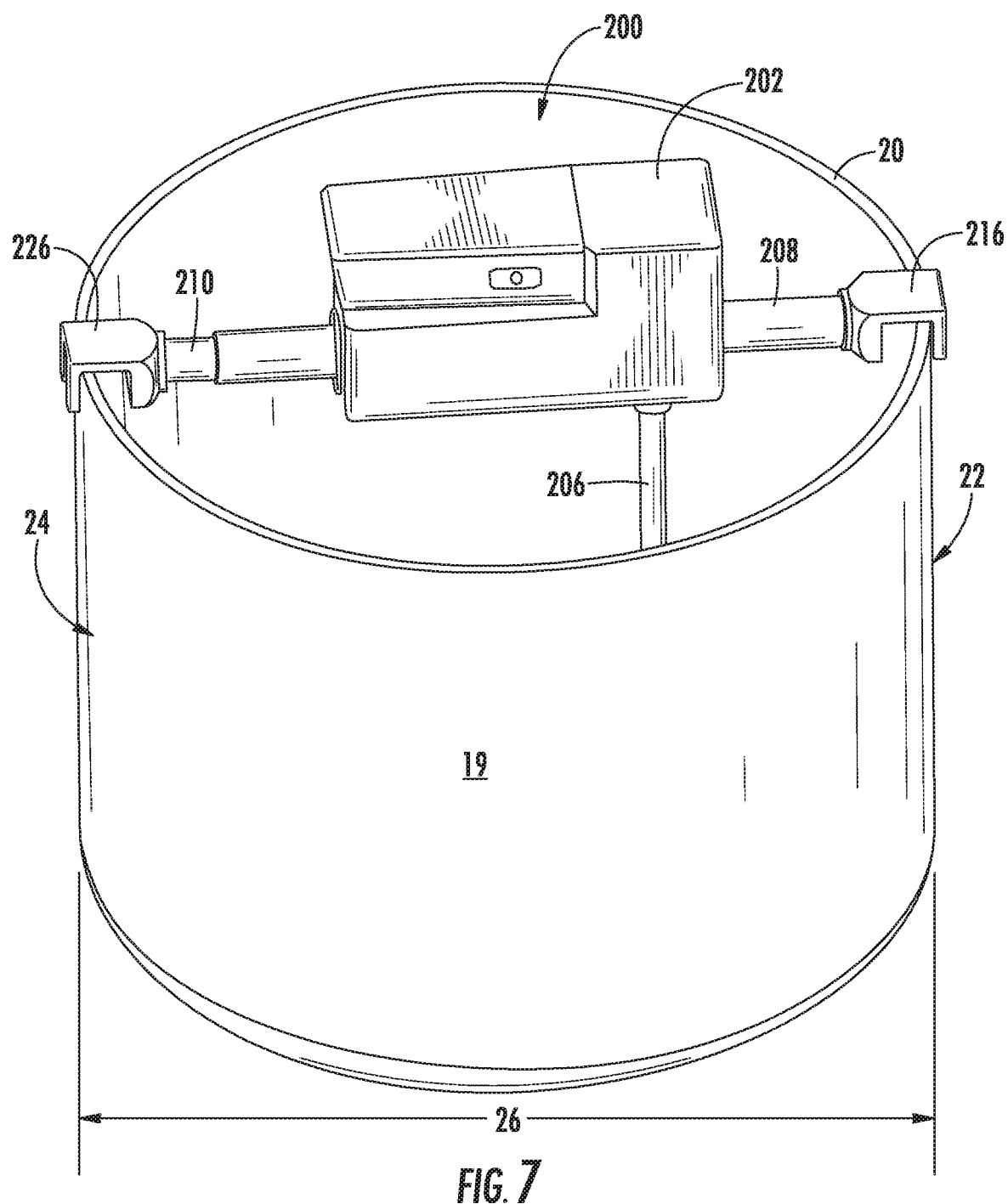
FIG. 7 provides a perspective view of an exemplary small cooking utensil with an exemplary temperature probe according to one or more embodiments of the present subject matter therein.
Figure 8:
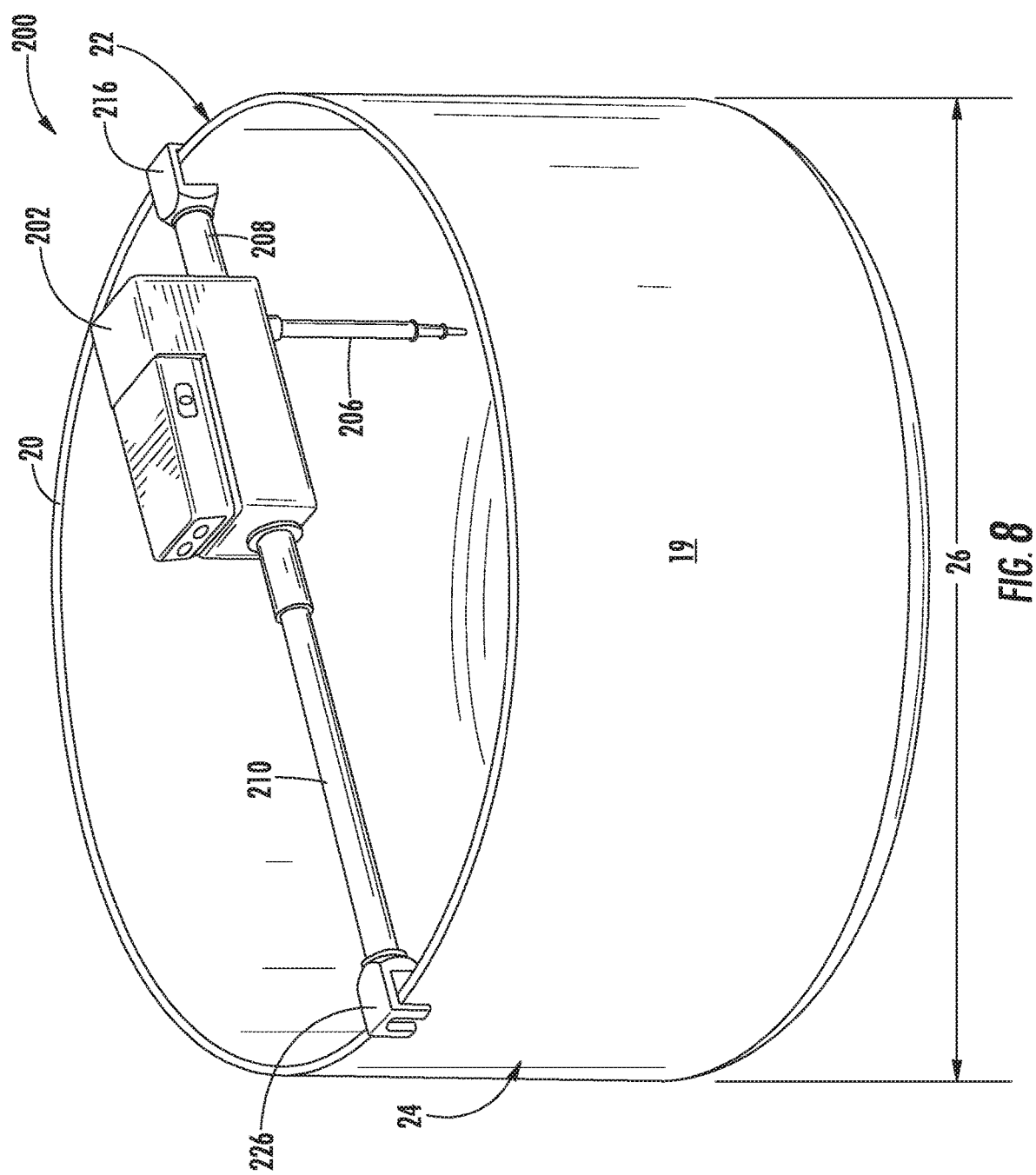
FIG. 8 provides a perspective view of an exemplary large cooking utensil with an exemplary temperature probe according to one or more embodiments of the present subject matter therein.

Turning now to FIG. 7, a perspective view of an exemplary cooking utensil 18 is provided, with the temperature probe 200 mounted on the cooking utensil. The temperature probe 200 may be configured for mounting on the cooking utensil 18, such as by engaging a rim 20 of the cooking utensil 18, e.g., at a top or upper edge of a side wall 19 of the cooking utensil 18. Similarly, FIG. 8 provides a perspective view of another exemplary cooking utensil 18 with the temperature probe 200 mounted on the rim 20 of the cooking utensil 18. As will be described in more detail below, the temperature probe 200 may be configured for contact measurement of the diameter 26 of the cooking utensil 18, e.g., based on the position of the extension arm 210 which will vary in proportion to the diameter 26.

Referring now generally to FIGS. 5 through 8, in some embodiments the fixed arm 208 may include a first hook 216 configured to engage the rim 20 (FIGS. 7 and 8) of the cooking utensil 18 and the extension arm 210 may include a second hook 226 configured to engage the rim 20 of the cooking utensil 18. Each hook 216 and 226 may be positioned at an end of the respective arm 208 and 210. For example, the fixed arm 208 may terminate at the first hook 216 and the extension arm 210 may terminate at the second hook 226. The rim 20 may be defined at a top or upper edge of a side wall 19 of the cooking utensil 18. In some embodiments, the temperature probe 200 may include a biasing element 228 which is configured to bias the hooks 216 and 226 against the side wall 19 and/or rim 20 of the cooking utensil 18. In various embodiments the biasing element 228 may be a tension spring or a compression spring. For example, the biasing element 228 may be a helical spring 228, e.g., as illustrated in FIG. 6, which is configured to bias the first hook 216 and the second hook 226 towards each other, e.g., the helical spring 228 may bias the extension arm 210 towards the sleeve 218 and/or the fixed arm 208. In order to more clearly illustrate internal components of the temperature probe 200, the spring 228 (which is an embodiment of a biasing element 228) is depicted in FIG. 6 with a middle portion thereof cut away.

As mentioned above, the temperature probe 200, in particular the arms 208 and 210 thereof, may be configured to span a diameter 26 of the cooking utensil 18. For example, the fixed arm 208 may be configured for mounting on the cooking utensil 18 at a first side 22 of the cooking utensil 18 and the extension arm 210 may be configured for mounting on a second side 24 of the cooking utensil 18, where the second side 24 is opposite, such as diametrically opposite, the first side 22 of the cooking utensil 18.

In some embodiments, the temperature probe 200 may be configured for measurement of a diameter 26 of the cooking utensil 18. For example, as illustrated in FIGS. 7 and 8, the fixed arm 208 of the temperature probe 200 may be mountable on the cooking utensil 18, e.g., at the first side 22 of the cooking utensil 18, and the extension arm 210 of the temperature probe 200 may be mountable on the second side 24 of the cooking utensil 18 opposite the first side 22 of the cooking utensil 18. For example, as may be seen by comparing FIGS. 7 and 8, the fixed arm 208 provides a minimum clearance between the temperature probe 200, e.g., the temperature sensor 206 thereof, and the side wall 19 of the cooking utensil 18, whereas the extension arm 210 varies in position according to the size, e.g., diameter 26, of the cooking utensil 18. In some embodiments, the extension arm 210 may telescope towards and away from the probe body 202 in order to reach across the diameter 26 of the cooking utensil 18 such that the temperature probe 200 spans the diameter 26 of the cooking probe 200. In such embodiments, the position of the extension arm 210 when the temperature probe 200 spans the diameter 26 as described varies based on the diameter 26 of the cooking utensil 18. The position of the extension arm 210 may include, e.g., the degree of extension of the arm 210 away from the probe body 202 and/or the distance between the second hook 226 at the end of the extension arm 210 and the second side 222 of the probe body 202.

In various embodiments, the position of the extension arm 210 may be electronically sensed or measured. For example, in some embodiments, the temperature probe 200 may include at least one switch 230, such as a microswitch or miniature snap-action switch, e.g., as illustrated in FIG. 6. The extension arm 210 may travel along a travel path, e.g., parallel to a longitudinal axis of the extension arm 210 and the sleeve 218/first arm 208. In some embodiments, the switch 230 may be positioned along the travel path of the extension arm 210. For example, an aperture 232 may be defined in the sleeve 218 and the switch 230 may extend though the sleeve 218, e.g., through the aperture 232, within or into the travel path of the extension arm 210. For example, the switch 230 may extend generally perpendicularly to the longitudinal axis, such as along a transverse axis or direction. Thus, the extension arm 210 may actuate the switch 230 when the extension arm 210 travels along the travel path between a retracted position (e.g., to span the diameter of a smaller utensil 18, as illustrated in FIG. 7) and an extended position (e.g., to span the diameter of a larger utensil 18, as illustrated in FIG. 8). Thus, the temperature probe 200 may define at least one threshold, e.g., based on the location of the switch 230 within the probe body 202, which distinguishes the retracted position of the extension arm 210 (corresponding to a small cooking utensil 18) and the extended position of the extension arm 210 (corresponding to a large cooking utensil 18). In such embodiments, the temperature probe 200 may communicate with the cooktop appliance 100, e.g., wirelessly or via a cord and plug, to indicate the size, e.g., diameter 26, of the cooking utensil 18 and the operation of the cooktop appliance 100 may be modified to provide an appropriate output from a corresponding burner, e.g., burner 150 above which the cooking utensil 18 is located as illustrated in FIG. 3, for the size of the cooking utensil 18. For example, the diameter threshold to distinguish a large utensil from a small utensil may correspond to about eight inches or more, such as about ten inches or more, such as about eleven inches, about twelve inches, or greater than twelve inches, where a cooking utensil 18 having a diameter 26 below the threshold may be considered small for purposes of the present disclosure and a cooking utensil 18 having a diameter 26 above the threshold may be considered large for purposes of the present disclosure. Thus, for example, when the temperature probe 200 determines that a cooking utensil 18 is below the threshold, the operation of the cooktop appliance 100 may be appropriately constrained given the relatively small size of the cooking utensil, e.g., "relatively small" meaning with reference to the size or power level of the corresponding burner on or above which the cooking utensil 18 is placed.

In additional embodiments, the temperature probe 200 may define multiple thresholds. For example, the temperature probe 200 may include two switches 230 and may thereby be configured to distinguish between, e.g., small, medium, and large cooking utensils 18. In some embodiments, the temperature probe 200 may further include a third switch or more than three switches. In additional embodiments, the temperature probe 200 may also or instead include a potentiometer where the extension arm 210 provides a sliding contact with the potentiometer, whereby numerous thresholds or settings, e.g., infinite or practically infinite, thresholds may be distinguished by the temperature probe 200.

As may be seen in FIG. 6, the temperature probe 200 may include a controller 212 which is operably connected to various other components of the temperature probe 200. For example, the controller 212 may be operatively connected to the switch 230. The controller 212 of the temperature probe 200 may generally include a computing device having one or more processor(s) and associated memory device(s), etc., similar to the controller 52 of the cooktop appliance 100, as described above.

The temperature probe 200 may also include a wireless communication module 214. The wireless communication module 214 may be configured for communication with the cooktop appliance 100, such as with the controller 52 thereof, e.g., wireless communication via the wireless communication module 214 and/or wired communication via a cord and a plug. The controller 212 of the temperature probe 200 may also be operatively connected to the wireless communication module 214, whereby the temperature probe 200 may transmit and receive signals to and from the cooktop appliance 100. In some embodiments, the controller 212 of the temperature probe 200 may be configured to determine the diameter 26 of the cooking utensil 18 based on a position of the extension arm 218, e.g., based on a status of the switch 230, as mentioned. In such embodiments, the controller 212 may further be configured to transmit a signal based on the position of the extension arm 210, which, as mentioned, corresponds to the diameter 26 of the cooking utensil 18, to the cooktop appliance 100, e.g., via the wireless communications module 214.

In various embodiments, the diameter 26 of the cooking utensil 18 may be used to determine an upper limit for the flow of fuel to the burner 150 via the control valve 34. For example, the upper limit for the flow of fuel to the burner 150 via the control valve 34 may be based on the diameter 26 of the cooking utensil 18. In particular, when the diameter 26 of the cooking utensil 18 is undersized compared to a size or power level of the burner 150, the upper limit for the flow of fuel to the burner 150 may be less than a maximum possible or capable flow of fuel to the burner 150, e.g., the maximum possible flow of fuel may be the highest volumetric flow rate of fuel which the control valve 34 is capable of providing or permitting to the burner 150. For example, the control valve 34 may be movable from a zero percent position (closed) to a one hundred percent position (open), with a variety of intermediate positions between the closed position and the open position, such that the upper limit based on the diameter 26 of the cooking utensil 18 may be or correspond to an intermediate position of the control valve 34 which is less than the fully open position of the control valve 34, such as a seventy-five percent position or a ninety percent position. The foregoing description of a zero to one hundred percent range is by way of example only. For instance, the control valve 34 may, in some embodiments, be actuated by a stepper motor with a range of possible positions on the order of five to ten thousand possible positions.

It should be understood that the "size" or "power level" of the burner 150 is used herein to refer to the maximum heat and/or flame output of which the burner 150 is capable or for which the burner 150 is configured. For example, the size or power level of the burner 150 may correspond to, e.g., be proportional to, the physical dimensions of the burner 150, such as the outer perimeter, e.g., diameter, of the burner 150 as well as the size and spacing of flame ports defined generally along the outer perimeter. For instance, in embodiments where the burner 150 is annular (i.e., ring-shaped), including multi-ring burners, the size or power level of the burner 150 may correspond to, e.g., be proportional to, the outer diameter or outermost diameter of the outermost ring of a multi-ring burner. The actual flame size produced by the burner 150 may vary from operation to operation based on, e.g., the cookware used and the ambient air flow, among other factors. However, it is understood that a certain minimum size, e.g., diameter 26, is recommended for the cooking utensil 18 to be compatible with the burner 150, e.g., to allow an adequate factor of safety in the possible heat and/or flame output from the burner 150 relative to the size of the cooking utensil. Thus, as described above, when a cooking utensil 18 is incompatible with, e.g., too small for, the burner 150 based on the maximum possible output of the burner 150, the output of the burner 150 may be constrained by the upper limit for the flow of fuel to the burner 150.

According to various embodiments of the present disclosure, the range appliance 100 may be configured for a precision cooking mode and/or methods of operating the range appliance 100 may include precision cooking mode. Precision cooking mode generally includes a closed-loop control algorithm used to automatically (e.g., without user input such as adjusting the knob(s) 156) adjust the flow of gas to one or more of the burners 144, 146, 148, 150 and griddle burner 160. Utilizing temperature measurements from temperature probe 200, controller 52 may adjust the corresponding control valve 34 for the respective burner on which the utensil 18 is located, e.g., the control valve 34 connected to burner 150 in the illustrated example, and regulate the flow of gaseous fuel to, e.g., burner 150. For example, the user may turn on the closed loop control system by initiating precision cooking mode, such as by pressing a corresponding one of the inputs 157 on the user interface 154. Other inputs 157 of the user interface 154 may be used to input a user-defined set temperature or target temperature for the cooking operation. Notably, the precision cooking operation may be constrained by or in response to data from the temperature probe 200. For example, the output of the closed-loop algorithm may be modified or limited by the upper limit for the flow of fuel to the burner 150 which is determined based on the diameter 26 of the cooking utensil 18.

Figure 9:
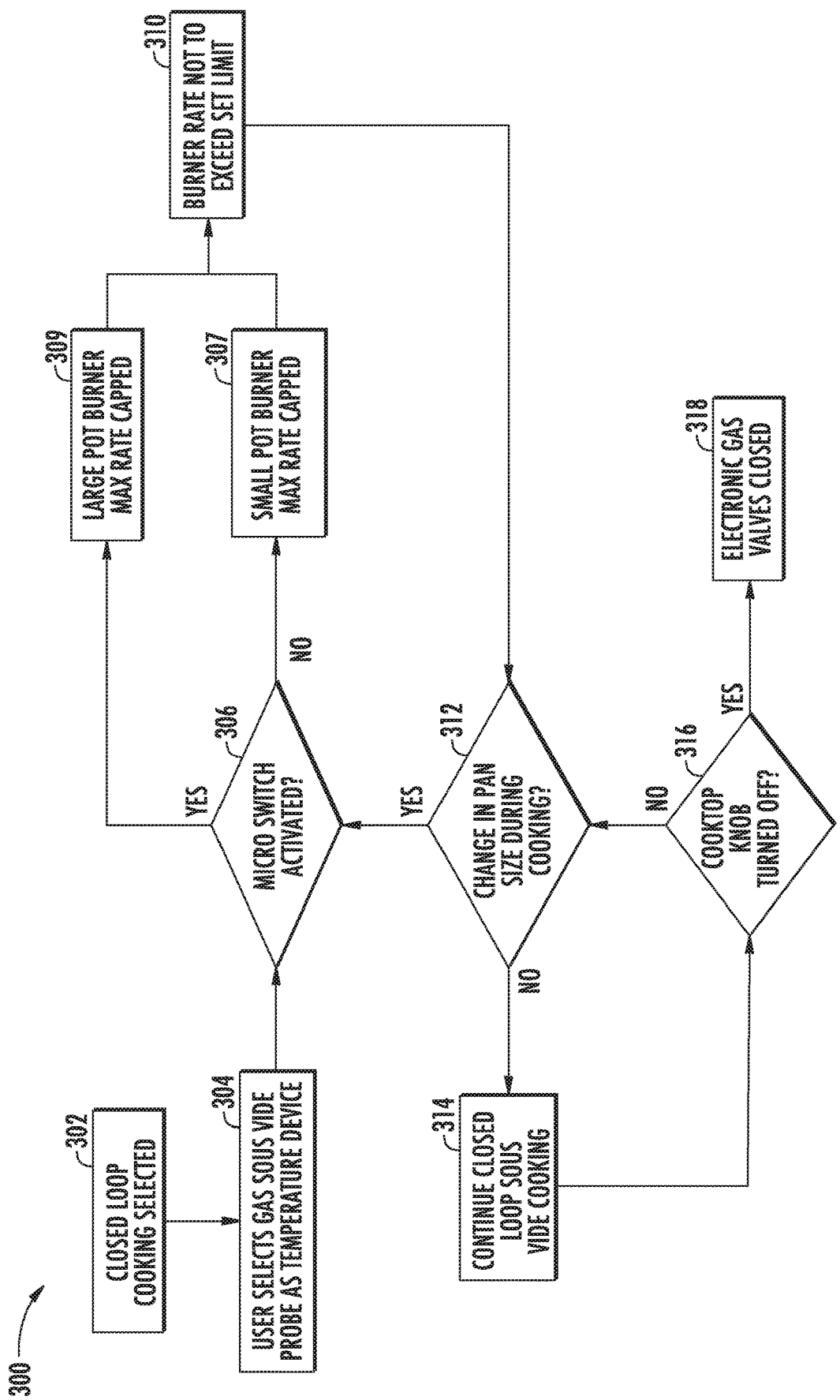
FIG. 9 provides a flow diagram of an exemplary method of operating an oven appliance according to one or more embodiments of the present subject matter.

Embodiments of the present disclosure also include methods of operating a cooktop appliance with a temperature probe, such as the exemplary method 300 illustrated in FIG. 9. For example, exemplary methods according to the present disclosure may be used to operate the cooktop appliance 100 which is shown and described herein with the temperature probe 200 which is also shown and described herein, among other possible example appliances and probes. In various embodiments, such methods may include operating a gas burner of the cooktop appliance within a first range defined by a first maximum rate when a signal from the temperature probe, e.g., a controller thereof, indicates that the extension arm is in a retracted position and operating the gas burner within a second range defined by a second maximum rate which is greater than the first maximum rate when the signal from the controller of the temperature probe indicates that the extension arm is in an extended position.

The exemplary cooking cycle or operation method 300 illustrated in FIG. 9 may be initiated in response to one or more user commands, e.g., received via the inputs 157. For example, closed loop cooking may be selected as illustrated at step 302 in FIG. 9 and the temperature probe may be selected as the temperature device as illustrated at step 304 in FIG. 9. In some embodiments, the method 300 may include determining, at step 306, whether a switch, e.g., micro switch 230, has been activated. In such embodiments, when the switch is not activated, e.g., as shown at 307 in FIG. 9, the burner maximum rate may be capped at a small burner rate, e.g., the first maximum rate as discussed above. When the switch is activated, indicating that the extension arm 210 has been moved to the extended position in order to mount the temperature probe on a larger cooking utensil, the maximum rate of the burner may be set to a large pot rate, e.g., a second maximum rate greater than the first maximum rate, as discussed above, as illustrated at 309 in FIG. 9. In such embodiments, the burner rate may then be set not to exceed the applicable maximum rate, as illustrated at step 310, based on the diameter of the cooking utensil, as indicated or determined based on the position of the extension arm, e.g., in some embodiments, based on whether or not the extension arm has activated the switch. In some embodiments the first maximum rate may be between about 10,000 Btu/hr and about 14,000 Btu/hr, such as about 11,000 Btu/hr, and the second maximum rate may be between about 15,000 Btu/hr and about 20,000 Btu/hr, such as about 17,000 Btu/hr.

In some embodiments, the method 300 may further include, and/or the controller of the temperature probe may further be configured for, detecting a change in a size of a cooking utensil during the operation of the cooktop appliance, such as during the operation of the gas burner of the cooktop appliance within one of the first range or the second range. In such embodiments, when a change in the size of the cooking utensil is discovered or detected, e.g., at step 312 in FIG. 9, the method 300 may then return to step 306 in order to determine whether the newly detected size of the cooking utensil is above or below the threshold. In such embodiments, when the threshold is crossed, e.g., when a small cooking utensil is replaced with a large cooking utensil or vice versa, the method 300 may then include adjusting the operation of the cooktop appliance accordingly. For example, the method 300 may include, after initially operating the gas burner within one of the first range or the second range, operating the gas burner within the other of the first range or the second range after detecting the change in the size of the cooking utensil when a change in utensil size is detected during the cooking operation, e.g., when the change in utensil size includes crossing the size threshold. Thus, for example, the method 300 may include operating the gas burner within the second range, detecting a change in the size of the cooking utensil 18, and then operating the gas burner within the first range after detecting the change in size, and/or operating the gas burner within the first range, detecting a change in the size of the cooking utensil 18, and then operating the gas burner within the second range after detecting the change in size.

As further illustrated in FIG. 9, the method 300 may also include continuing the closed-loop cooking mode, e.g., sous vide cooking, when the size of the utensil does not change, e.g., as illustrated at step 314. Then, the cooking operation may continue until the cooktop appliance is deactivated. For example, the method 300 may include determining, at step 316, whether a cooktop knob corresponding to the operative burner has been turned off, and the cooking operation may continue as long as the determination at step 316 is "NO" and the determination of changed utensil size at 312 is also "NO." When the control knob is turned off at 316, the control valve is closed at step 318 to end the cooking operation or cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A temperature probe for a cooktop appliance, the cooktop appliance comprising a gas burner, a control valve coupled to the gas burner to regulate a flow of fuel to the gas burner, and a controller in communication with the control valve, the temperature probe comprising:
   a probe body;
   a temperature sensor extending from the probe body;
   a first arm connected to the probe body, the first arm configured for mounting on a cooking utensil at a first side of the cooking utensil;
   a second arm connected to the probe body, the second arm configured for mounting on a second side of the cooking utensil, wherein the second arm is an extension arm telescopically mounted within a sleeve whereby the second arm extends linearly along a common longitudinal axis of the first arm and the second arm; and
   a controller configured for communication with the controller of the cooktop appliance, the controller of the temperature probe configured to transmit a signal to the controller of the cooktop appliance corresponding to a size of the cooking utensil, wherein the signal corresponding to the size of the cooking utensil is based on a position of the extension arm of the temperature probe.

2. The temperature probe of claim 1, further comprising a switch within the probe body, the switch positioned in the probe body whereby the extension arm deactivates the switch when the extension arm is in a retracted position.

3. The temperature probe of claim 2, wherein the switch extends through the sleeve within a travel path of the extension arm.

4. The temperature probe of claim 1, wherein the first arm is a fixed arm integrally formed with the sleeve.

5. The temperature probe of claim 4, wherein the fixed arm and the extension arm are configured to span a diameter of the cooking utensil when the fixed arm is mounted on the first side of the cooking utensil and the extension arm is mounted on the second side of the cooking utensil opposite the first side of the cooking utensil with the extension arm in a retracted position when the diameter of the cooking utensil is below a threshold and with the extension arm in an extended position when the diameter of the cooking utensil is above the threshold.

6. The temperature probe of claim 1, wherein the first arm and the second arm are colinear.

7. The temperature probe of claim 1, wherein the temperature sensor extends from the probe body perpendicular to the first arm and the second arm.

8. The temperature probe of claim 1, wherein the first arm comprises a first hook configured to engage a rim of the cooking utensil at the first side of the cooking utensil and the second arm comprises a second hook configured to engage the rim of the cooking utensil at the second side of the cooking utensil.

9. The temperature probe of claim 1, further comprising a wireless communication module, wherein the controller of the temperature probe is configured for wireless communication with the controller of the cooktop appliance via the wireless communication module.

10. A temperature probe for a cooktop appliance, the cooktop appliance comprising a gas burner, a control valve coupled to the gas burner to regulate a flow of fuel to the gas burner, and a controller in communication with the control valve, the temperature probe comprising:
  a probe body;
  a sleeve extending through the probe body;
  a temperature sensor extending from the probe body;
  a first arm extending from a first side of the probe body;
  a second arm extending from a second side of the probe body, wherein the second arm is an extension arm telescopically mounted within the sleeve whereby the second arm extends linearly along a common longitudinal axis of the first arm and the second arm; and
  a controller configured for communication with the controller of the cooktop appliance, the controller of the temperature probe configured to transmit a signal to the controller of the cooktop appliance corresponding to a size of the cooking utensil.

11. The temperature probe of claim 10, wherein the first arm is a fixed arm integrally formed with the sleeve.

12. The temperature probe of claim 10, further comprising a switch positioned within the probe body and extending into the sleeve transverse to a longitudinal axis of the sleeve, wherein the signal corresponding to the size of the cooking utensil is based on a position of the extension arm of the temperature probe, and the position of the extension arm is determined by the status of the switch.

13. The temperature probe of claim 10, further comprising a wireless communication module, wherein the controller of the temperature probe is configured for wireless communication with the controller of the cooktop appliance via the wireless communication module.

14. The temperature probe of claim 10, wherein the temperature sensor extends from the probe body perpendicular to the first arm and the second arm.

15. The temperature probe of claim 10, wherein the second arm extends from the second side of the probe body opposite the first side of the probe body from which the first arm extends, wherein the first arm terminates at a first hook, the first hook configured to engage a rim of a cooking utensil at a first side of the cooking utensil and wherein the second arm terminates at a second hook configured to engage the rim of the cooking utensil at a second side of the cooking utensil opposite the first side of the cooking utensil.

16. A method of operating a cooktop appliance with a temperature probe, the cooktop appliance comprising a gas burner, a control valve coupled to the gas burner to regulate a flow of fuel to the gas burner, and a controller in communication with the control valve, the temperature probe comprising a probe body, a temperature sensor extending from the probe body, a first arm extending from a first side of the probe body, a second arm extending from a second side of the probe body, wherein at least one of the first arm and the second arm is a telescopic extension arm wherein the at least one of the first arm and the second arm extends linearly along a common longitudinal axis of the first arm and the second arm, and a controller configured for communication with the controller of the cooktop appliance, the controller of the temperature probe configured to transmit a signal to the controller of the cooktop appliance corresponding to a size of the cooking utensil, wherein the signal that corresponds to the size of the cooking utensil is based on a position of the at least one telescopic extension arm of the temperature probe, the method comprising:
  operating the gas burner within a first range defined by a first maximum rate when the signal from the controller of the temperature probe corresponds to a small size of the cooking utensil; and
  operating the gas burner within a second range defined by a second maximum rate when the signal from the controller of the temperature probe corresponds to a large size of the cooking utensil;
  wherein the first maximum rate is less than the second maximum rate.

17. The method of claim 16, wherein the temperature probe further comprises a switch, wherein the gas burner is operated within the second range when the switch is activated, and wherein the gas burner is operated within the first range when the switch is not activated.

18. The method of claim 16, further comprising detecting a change in a size of a cooking utensil during the operation of the gas burner within one of the first range or the second range, and operating the gas burner within the other of the first range or the second range after detecting the change in the size of the cooking utensil.

* * * * *